No. 726,679. PATENTED APR. 28, 1903.
B. M. W. HANSON.
STOPPING AND REVERSING MECHANISM.
APPLICATION FILED JULY 28, 1902.
NO MODEL. 3 SHEETS—SHEET 1.

Witnesses:
H. G. Campbell.
Frances E. Blodgett.

Inventor:
B. M. W. Hanson.
By his Attorneys:
Blodgett & Peck

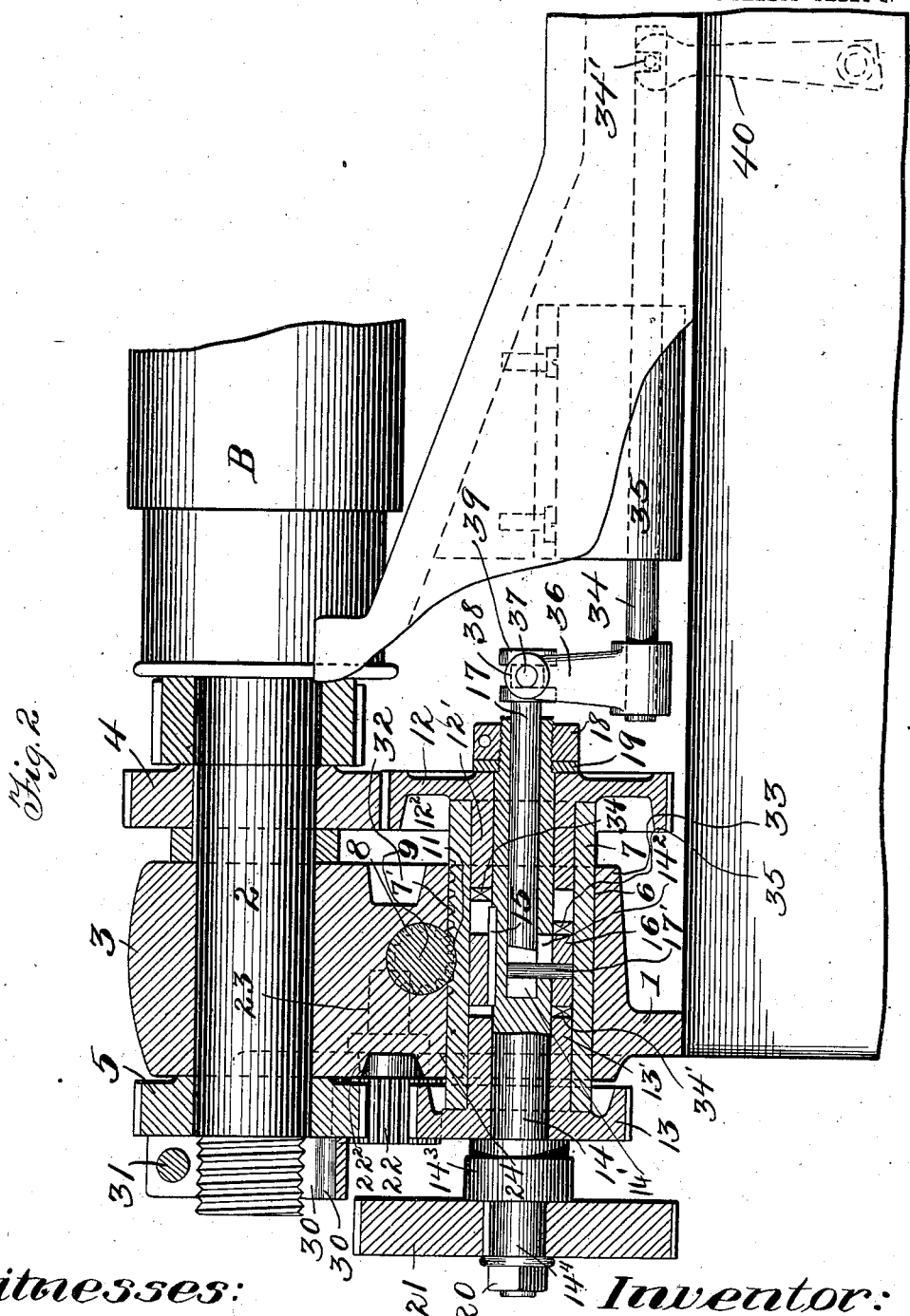

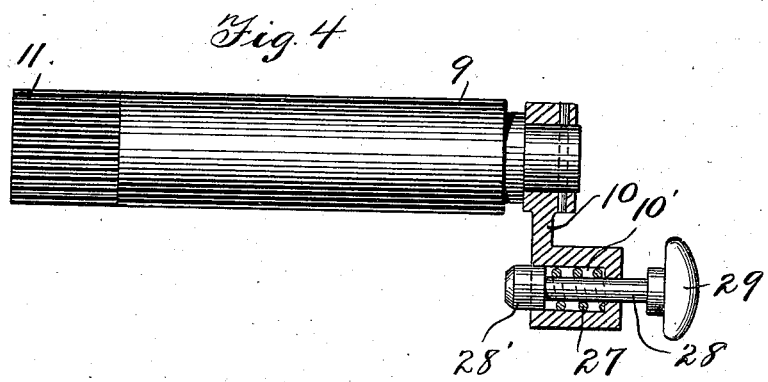
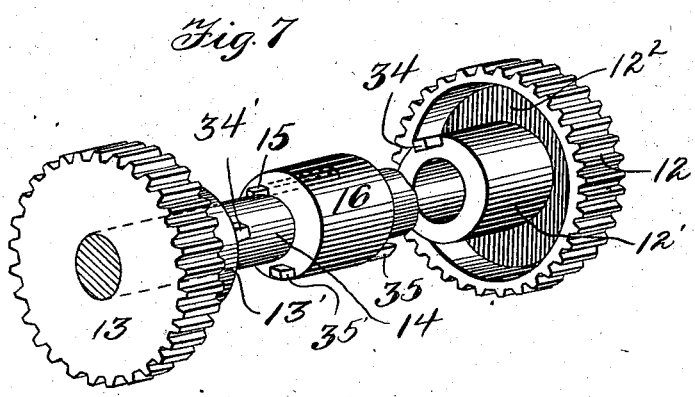
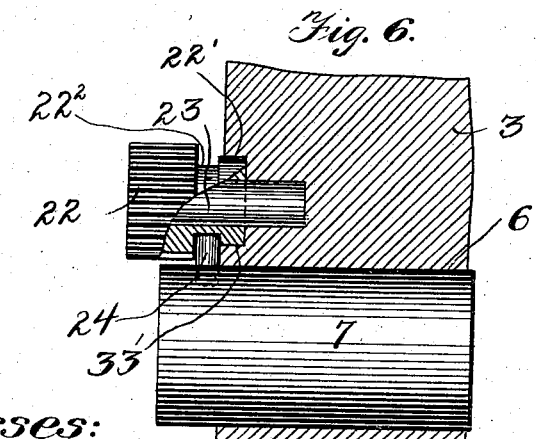

United States Patent Office.

BENGT M. W. HANSON, OF HARTFORD, CONNECTICUT, ASSIGNOR TO PRATT AND WHITNEY COMPANY, OF HARTFORD, CONNECTICUT, A CORPORATION OF NEW JERSEY.

STOPPING AND REVERSING MECHANISM.

SPECIFICATION forming part of Letters Patent No. 726,679, dated April 28, 1903.

Original application filed May 3, 1902, Serial No. 105,839. Divided and this application filed July 28, 1902. Serial No. 117,285. (No model.)

*To all whom it may concern:*

Be it known that I, BENGT M. W. HANSON, a subject of the King of Sweden and Norway, residing at Hartford, in the county of Hartford and State of Connecticut, have invented certain new and useful Improvements in Stopping and Reversing Mechanism, of which the following is a specification.

My invention relates to reversing mechanism, and is primarily designed for employment with lathes, and especially for controlling the rotary movement of the lead-screw shaft for reciprocating the slide-rest carriage of such machines, although it is not limited to said use.

One object of the invention is the provision of improved mechanism for stopping and reversing the rotation of a driven shaft, said mechanism involving shiftable gear elements loose thereon and in engagement normally with driving-gear elements and a movable clutch for connecting and disconnecting the loose gear elements to said driven shaft.

Another object of the invention is the provision in reversing and stopping mechanism of a shiftable sleeve carrying a pair of gears and of means for shifting said sleeve to carry said gears and an idler in engagement with one of them out of mesh with the driving-gears of the machine.

Further objects of the invention will be set forth in the following description.

Figure 1:
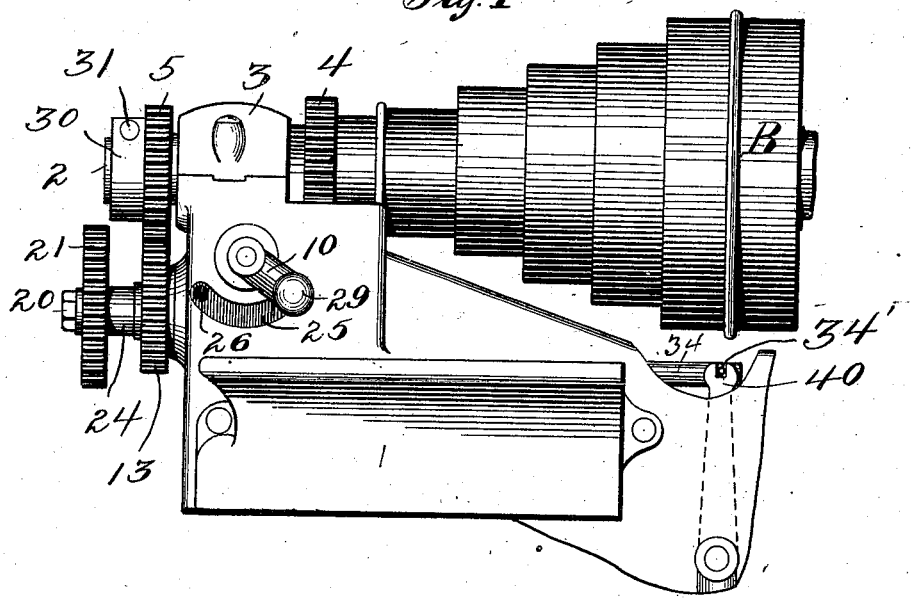
Figure 3:
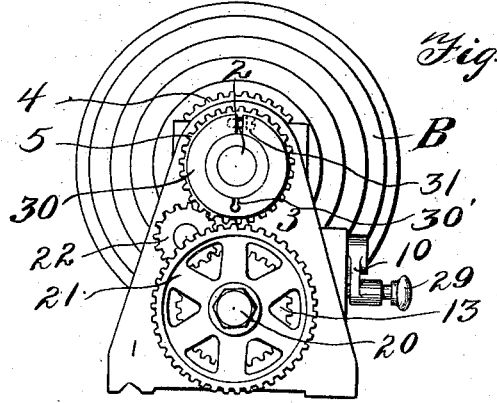
Figure 5:
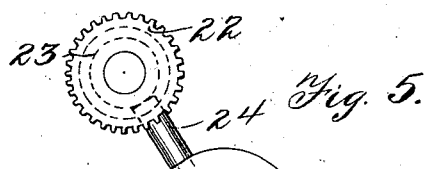

In the accompanying drawings, Figure 1 is a side elevation of part of a machine—for instance, a lathe—in which my invention may be embodied. Fig. 2 is a longitudinal vertical section of the invention, parts being shown in elevation. Fig. 3 is an end view of the machine, showing the reversing-gearing. Fig. 4 is an elevation, partially in section, of a part of the mechanism for throwing the driven gears out of engagement with their driving-gears. Fig. 5 is an end view of the idler-pinion and shiftable sleeve. Fig. 6 is a detail view of the idler-pinion, its stud, and the shiftable sleeve; and Fig. 7 is a perspective view of the clutch mechanism.

Referring to the drawings, the numeral 1 designates the frame of the machine, which in the illustration given is shown as a head in which the live-spindle 2 of a lathe is mounted, although any other suitable support may be employed. This shaft or spindle 2 is journaled in a bearing 3 and has fixed thereon adjacent to each side of said bearing a pair of gears 4 and 5, respectively, and it may be driven by a belt upon a pulley B, secured to the shaft, or in any other desired manner. Within an opening 6 of the frame is mounted a sleeve 7, provided with rack or equivalent teeth 7', and in another opening 8 of said frame is journaled a shaft 9, having a handle 10 at one end exterior of the frame and a pinion 11 at its opposite end, said pinion being in engagement with the rack-teeth 7'.

Designated by 12 is a gear-wheel having a hub 12' fitted in one end of the sleeve 7, and designated by 13 is another gear-wheel having a hub 13' mounted in the opposite end of said sleeve. Through these gear-wheels and their hubs passes a shaft 14, said gear-wheels being loose thereon, and carried by the shaft is a spline 15, engaging a longitudinal groove in a clutch 16. This shaft 14 is longitudinally perforated at 14' to receive a rod 17, carrying a pin 17', working in a slot $14^2$ of said shaft and entering the clutch 16. Shaft 14 is externally threaded at its inner end to receive a nut 18 and a washer 19, the latter bearing against a shoulder of the shaft and the face of the gear-wheel 12, and at its opposite extremity said shaft is provided with a collar $14^3$ to receive the bearing contact of gear 13 and with an extension $14^4$, threaded to engage a nut 20. Secured to this extension $14^4$ is a gear 21, which will engage a similar gear (not shown) on the shaft to be driven.

Designated by 22 is an idler-pinion loosely mounted on a stud 23, projecting from the head or frame 1, said pinion having a hub 22', provided with a circumferential groove $22^2$ for the reception of a pin 24, carried by the sleeve 7, the construction being such that when the sleeve carrying gears 12 and 13 is reciprocated toward the left the pinion will move with said sleeve and will be slid along the stud until it is out of engagement with the gear 5, said gear 12 being also carried out of engagement with the gear 4 upon this movement of the sleeve.

In the frame 1 is formed a curved slot 25, provided with a recess 26 at each of its ends, and in the crank or handle 10 is a bore 10' for the reception of a spring 27, surrounding the shank of a plunger 28, bearing at its inner end against a head 28' of said shank, this head having a tip shaped to enter either of the recesses 26 and serving to lock the handle at each limit of its stroke. For withdrawing the plunger against the resistance of its controlling-spring a hand grasp or knob 29 is provided, as illustrated in Figs. 1 and 4.

At its end adjacent to gear 5 the shaft 2 is threaded to receive a split ring or collar 30, recessed at 30' to afford greater resiliency and clamped upon the said threaded end by means of a screw 31, and by adjusting said collar any lost motion or play of said shaft may be readily taken up and said shaft accurately secured in place.

Upon one of its sides the head or frame 1 is recessed at 32, and gear 12 is chambered at $12^2$ to fit over the projection 33 of the frame formed by said recess when the sleeve 7 is shifted to the left to withdraw said gear from engagement with the gear 4 of shaft 2. So, too, the frame is recessed at its opposite side at 33' to receive the hub 22' of pinion 22.

The hub 12' of gear-wheel 12 and the hub 13' of gear-wheel 13 are provided with clutch-teeth 34 34', respectively, and the clutch 16 is equipped at each end with a tooth 35 35', respectively, for engagement with the teeth of the hubs. Any other suitable form of clutch-engaging surfaces may, however, be employed without departure from the invention, which is not limited to a specific kind of clutch.

For reciprocating the clutch-actuating rod 17 any desired means, either manual or automatic, may be employed; but there is shown for this purpose a rod 34, mounted for sliding movement in a guide 35, secured to the frame, and carrying at its inner end a yoke 36, having laterally-projecting pins 37, which enter a groove 38 in the head 39 of the rod 17, said rod 34 being provided with a pin 34' at its right-hand end, which is received in a slot of a pivoted lever 40, which may be actuated by any desired means—as, for instance, a shiftable rod of the kind shown in my application filed May 3, 1902, Serial No. 105,839, of which the present case is a division.

My improved stopping and reversing mechanism operates as follows: In Figs. 1 and 2 the clutch 16 is shown shifted to the left, and therefore in engagement with the hub 13' of gear 13, thereby causing said gear as it is rotated by the idler 22, driven by the gear 5 of shaft 2, to be connected with the shaft 14 and to drive said shaft and its gear 21 in one direction. To reverse this motion of the shaft, the rod 17 and its connected clutch are shifted to the right, thus connecting the clutch with the hub 12' of gear 12 in engagement with the gear 4 of shaft 2, the idler-pinion 22 and gear 13 then rotating idly upon their supports. When it is desired, the clutch may be thrown to a neutral position intermediate the clutch-faces on the hubs of gears 12 and 13, as shown in Fig. 7, and then these gears rotate idly upon the shaft 14, and the same remains stationary. Should it be desired to throw the idler 22 and gear 12 out of mesh with the gears 4 and 5 of shaft 2, the plunger 28 is withdrawn from the locking-recess 26, in which it is shown seated in Fig. 1, and the handle 10 is swung to the left until said plunger snaps into the other locking-recess of the groove 25, this action turning the shaft 9 and causing the teeth 11 thereof to engage the rack-teeth 7' of sleeve 7 and reciprocate said sleeve, the gears 12 and 13, carried thereby, and the idler-pinion 22 to the left to throw said pinion and said gear 12 out of engagement with their actuating-gears, as above stated. This then leaves the shaft 2 rotating freely in its bearings without turning any of the gearing controlled by the sleeve 7 and enables (should the mechanism be employed in a lathe) filing, burnishing, and other operations upon the stock while the remainder of the machine is at rest.

Many changes may be made in the details of the construction and the arrangement and location thereof, and while the parts are shown disposed horizontally this is not essential, and the invention is not limited to any specific kind of gearing nor to any special devices for actuating the sleeve and the clutch.

Having thus described my invention, what I claim is—

1. The combination, with a driving-shaft, of gearing carried by said shaft; a shiftable sleeve; gearing carried by the sleeve and controlled by the gearing of the shaft; a frame in which the sleeve is mounted for longitudinal movement; means for reciprocating the sleeve to throw the gearing carried thereby out of engagement with its actuating-gearing; a shaft movable with the sleeve; and means for clutching said gearing to the shaft.

2. The combination, with a support, of a driving-shaft journaled in said support; a pair of gears rigid with said shaft; a movably-mounted idler in engagement with one of said gears; a sleeve; a pair of gears carried by said sleeve; means for connecting the idler with said sleeve; a shaft upon which the gears are loosely mounted; and means for alternately clutching said gears to the shaft.

3. The combination, with a support, of a driving-shaft journaled in said support; a pair of gears rigid with said shaft; a movably-mounted idler in engagement with one of said gears; a sleeve; a pair of gears carried by said sleeve; means for connecting the idler with said sleeve; a shaft upon which the gears are loosely mounted; means for alternately clutching said gears to the shaft; and means for reciprocating the sleeve to shift the gears carried thereby and the idler out of engagement with the gears on the driving-shaft.

4. The combination, with a driving-shaft, of a support in which said shaft is journaled; gears carried by the driving-shaft; a stud projecting from the support; an idler journaled on said stud; a sleeve mounted for sliding movement in an opening of the support; a device connected to the sleeve and also to the idler; gears carried by the sleeve, and, respectively, in engagement with the idler and with a gear of the driving-shaft; a driven shaft; and means for alternately clutching said gears to the driven shaft.

5. The combination, with a driving-shaft, of a support in which said shaft is journaled; gears rigid with said driving-shaft; a stud projecting from the support; an idler having a grooved hub journaled on the stud; a sleeve mounted for sliding movement in an opening of the support; a device connected to the sleeve at one end and entering the groove of the idler-hub at its opposite end; gears carried by the sleeve and, respectively, in engagement with the idler and with a gear of the shaft; a driven shaft; and means for alternately clutching said gears to the driven shaft.

6. The combination, with a reciprocatory sleeve, of rotatable driven elements, each having a clutch-surface, carried by said sleeve; a shaft upon which said driven elements are loosely mounted; mechanism for actuating said driven elements in opposite directions; a clutch for alternately connecting the driven elements to the shaft upon which they are loosely mounted; and means for reciprocating the sleeve to throw its driven elements out of connection with their actuating mechanism.

7. The combination, with a reciprocatory sleeve having a gear-surface, of a support in which said sleeve is mounted; a gear journaled in said support and in engagement with the gear-surface of the sleeve; a pair of reversely-operable driven elements, each element having a clutch-surface, carried by said sleeve; means for rotating said driven elements; a shaft upon which the driven elements are loosely mounted; a clutch splined to the shaft; and means for reciprocating said clutch.

8. The combination, with a support having bearings disposed at an angle to each other, of a device reciprocatory in one of said bearings; reversely-operable gears carried by said device; means mounted in the other bearing of the support for actuating said device; means for rotating the gears; a shaft upon which said gears are loosely mounted; and a clutch in sliding connection with the shaft and adapted alternately to connect said gears thereto.

9. The combination, with a support, of a driving-shaft journaled in said support; a pair of gears carried by said driving-shaft; a slidingly-mounted idler in engagement with one of said gears; a reciprocatory sleeve carried by the support; a pair of gears mounted on the sleeve, one of said gears being in engagement with the idler and the other with a gear of the driving-shaft; means for connecting the idler and sleeve; a driven shaft; and a movable clutch for alternately connecting the gears to said driven shaft.

10. The combination, with a support, of a driving-shaft; driving elements secured to said driving-shaft; a stud carried by the support; an element actuated by one of said driving elements, and mounted for sliding movement upon the stud; a reciprocatory sleeve; means connecting said sleeve and the element upon the stud; reversely-driven elements carried by, and movable with, the sleeve; a shaft upon which said reversely-driven elements are loosely mounted; a clutch for alternately connecting the reversely-driven elements to said shaft; and means for actuating the clutch.

11. The combination, with a support, having bearings at an angle to each other, of a sleeve having a rack-surface mounted in one of said bearings; a shaft journaled in the other bearing; a pinion carried by said shaft; means for actuating said shaft; reversely-operable gearing carried by the sleeve; means for actuating said gearing; a shaft upon which said gearing is loosely mounted; and means for alternately clutching the elements of said gearing to said shaft.

12. The combination, with a support having bearings at right angles to each other, of a sleeve having a rack-surface mounted in one of said bearings; a shaft; a pinion carried by said shaft and in engagement with the rack-surface, said shaft being mounted in the other bearing of the support; a device for actuating said shaft; means for locking said device after the shaft has been actuated; a pair of gears carried by the sleeve, each gear having a clutch-surface; a driven shaft; a clutch having an engaging surface at each of its ends connected for sliding movement to said driven shaft; means for actuating the clutch; and means for driving the gears carried by the sleeve in opposite directions.

13. The combination, with a support having bearings located at an angle to each other, of a shaft journaled in one of said bearings; a handle on said shaft; means for locking the handle to the support after the shaft has been actuated; a pinion carried by the shaft; a sleeve in the other of said bearings, and having a rack-surface in engagement with said pinion; a driven element having a hub provided with a clutch-surface mounted in one end of the sleeve; a second driven element also having a hub with a clutch-surface mounted in the other end of said sleeve; means for actuating said driven elements in opposite directions; a driven shaft upon which said driven elements are loosely mounted; a clutch in sliding engagement with said driven shaft, and adapted alternately to connect said driven elements to the shaft; and means for actuating the clutch.

14. The combination, with a support, of a reciprocatory sleeve mounted in a bearing thereof; a pair of driven elements carried by the sleeve; means for actuating said driven elements in opposite directions; a driven shaft upon which the driven elements are loosely mounted; a clutch splined to the driven shaft; and means for actuating the clutch, to cause it alternately to connect said driven elements to the driven shaft.

15. The combination, with a support having a recess and a bearing, of a sleeve mounted for reciprocatory movement in the bearing; a chambered driven element carried by the sleeve; a second driven element also carried by the sleeve; means for rotating the driven elements in opposite directions; means for reciprocating the sleeve; a driven shaft; a clutch in sliding engagement with said shaft; and means for actuating the clutch.

16. The combination, with a support having a bearing and a recess in its side, of a reciprocatory sleeve mounted in the bearing; a chambered driven element carried by the sleeve; a second driven element also carried by the sleeve, each of said driven elements having a clutch-surface; mechanism for actuating said driven elements in opposite directions; a clutch splined to the shaft and having an engaging surface on each of its ends; a rod mounted in a bore of the driven shaft, and connected to said clutch; and means for actuating said rod.

17. The combination, with a support having a pair of bearings located at an angle to each other, and also having a groove provided with locking-recesses, of a shaft mounted in one of said bearings; a handle carried by said shaft; a spring-actuated plunger mounted in the handle, and adapted to engage said locking-recesses; a pinion carried by the shaft; a sleeve reciprocatory in the other bearing of the support and having a rack-surface in engagement with the pinion; a pair of driven elements having hubs fitted in the ends of the sleeve, each hub having a clutch-surface; means for rotating said driven elements in opposite directions; a driven shaft; a clutch, having a clutch-surface on each of its ends, slidingly connected to said driven shaft; and means for actuating the clutch.

18. The combination, with a support, of a driving-shaft journaled in said support; a pair of gears connected to said shaft; a stud projecting from the support; an idler-pinion sleeved upon the stud; a reciprocatory sleeve mounted in a bearing of the support; a device connecting the sleeve and pinion; a gear in engagement with the pinion, and having a hub fitted in one end of the sleeve and provided with a clutch-surface at its end; a second gear, also provided with a hub having a clutch-surface at its end, fitted in the opposite extremity of the sleeve, said gear being in engagement with one of the gears of the driving-shaft; a driven shaft upon which said gears are loosely mounted; a clutch on said driven shaft; and means for actuating the clutch.

In testimony whereof I affix my signature in presence of two witnesses.

BENGT M. W. HANSON.

Witnesses:
H. E. BAILEY,
W. F. DAY.